UNITED STATES PATENT OFFICE.

PAUL KESTNER, OF PARIS, FRANCE.

EDIBLE PRODUCT OBTAINED FROM THE SUGAR JUICES OF BEETS AND PROCESS OF OBTAINING IT.

1,419,057.  Specification of Letters Patent.  Patented June 6, 1922.

No Drawing.  Application filed June 30, 1920.  Serial No. 393,156.

(GRANTED UNDER THE PROVISIONS OF THE ACT OF MARCH 3, 1921, 41 STAT. L., 1313.)

*To all whom it may concern:*

Be it known that I, PAUL KESTNER, engineer, citizen of the French Republic, residing at Paris, Department of the Seine, in France, and having P. O. address 38 Rue Ribera, in the said city, have invented certain new and useful Improvements in a New or Improved Edible Product Obtained from the Sugar Juices of Beets and Processes of Obtaining It (for which I have filed applications in France resulting in Patent No. 508966, dated September 5, 1918, and addition No. 23470, dated March 30, 1920, and an application in Great Britain, filed February 7, 1919, resulting in Patent No. 135,235); and I do hereby declare the following to be a full, clear, and exact description of the invention, such as will enable others skilled in the art to which it appertains to make and use the same.

This invention has reference to a new or improved edible product obtained from the sugar juices of beet, and to a process of obtaining it.

The sugar juices of beet contain much nutritious matter, but when they are concentrated in the hitherto usual manner the concentrate has an unpleasant odour and a disagreeable flavour which are so pronounced as to render it practically unfit for use as a food. Further, the concentrate is almost invariably caramelized and its valuable properties are to a very material extent impaired. I am aware that it has been proposed to subject dried or drying beet sugar to the action of an air blast for the purpose of removing its characteristic smell and unpleasant flavour, and I wish it to be understood that I make no claim to that.

My invention, as to one part, consists in a non-caramelized concentrate of such juices prepared as hereinafter described, which is free from any unpleasant odour and flavour and in which the valuable nutritious properties of the juices are retained unimpaired, said concentrate forming a palatable, rich and nutritious food of considerable value. As to another part, my invention consists in an improved process of manufacture whereby the aforesaid valuable food may be readily produced the characteristic feature of which process is that the sugar juices are treated in an evaporator in which the temperature of evaporation is raised by setting up a counter pressure, and are maintained at a high temperature for a very brief period of time. The higher the temperature the shorter must be the time as aforesaid. If the desired concentration of the syrup be such that its boiling point under atmospheric pressure would be 120° C. I provide such a counter pressure that with the same degree of concentration the boiling point is raised to 130° C. (more or less) but the syrup must not be maintained at such a temperature for more than—in most cases—a few seconds. By removing the counter pressure—for example by allowing the syrup to flow out the vessel in which the pressure is being maintained—or in any suitable manner, I then at once cool the syrup. It will be advisable to make a test to enable the precise maximum period to be determined in the case of any particular sample of the juices. The higher the temperature of the syrup whilst it is being dehydrated, the more completely or perfectly will the deodorization be effected, but on the other hand, the higher the temperature the more imperative does it become to avoid exposing the syrup to it beyond a very brief period. In the production of "aerated" sugar, i. e., sugar in the form of fine powder, it has been proposed to heat a solution of sugar to about 280° F. and then to cool it quickly, but in that case the steam developed is allowed to escape freely and no counter pressure is produced or set up in the apparatus.

I do not confine myself to the use of any particular evaporating apparatus for carrying out my process, but I find it convenient and therefore prefer to employ the well known "Kestner" type of evaporator, which comprises a bundle or cluster of vertical tubes within a casing to which latter steam is admitted and to the lower ends of which tubes the juices (preferably already concentrated to some extent) are fed by means of a pump so as to maintain a constant supply. The steam evolved as the syrup is dehydrated in its passage up the tubes is not allowed to escape freely to the atmosphere means being provided whereby any desirable back pressure may be set up and consequently the syrup may be raised to the required high temperature without undue dehydration.

The best means for producing the increase of temperature necessary consists preferably by the use of a tubular evaporator in which the relation between the heating surface and the cross-section of the tubes is such that the required counter pressure is created in the tubes as the juices are passing therethrough, it does away with weighted valve, diaphragm or the like at the outlet.

As the steam that leaves the evaporator is at a pressure above atmospheric and therefore at a high temperature I propose to combine a drier with the evaporator, the two being as nearly as may be in juxtaposition, so that without much loss of heat the steam can be conducted to the drier and there utilized to dry the pulp. By this a simple and self-contained apparatus, for enabling both results (viz concentration of the syrup and drying of the pulp) to be attained most economically, is realized.

The dimensions of the evaporating apparatus will preferably by such that a single passage therethrough of the syrup will suffice to bring about the concentration in the manner described, although it is within the scope of my invention to employ a multiple effect apparatus in the first one or more of which the more or less thin sugary liquor will undergo what I term preliminary concentration so that a hot syrup of desired density will be supplied to the last effect in which the final process of dehydration in the manner described will be achieved.

After having undergone the final dehydration in the manner described the syrup is immediately conducted away and allowed to cool either naturally or the cooling may be accelerated by suitable known means, and if desired the cooling may be effected whilst the liquor is under a partial vacuum.

The sweet or sugary concentrate produced by my process—the essentials of which are rapidity of treatment and high temperature—constitutes a rich, appetizing and highly nutritious food, containing in a readily available form the nitrogenous matter, mineral salts, etc., of the beet juices, and which is distinguishable from similar substances or products in that there is an absence of disagreeable odour and flavour.

Claims:

1. A process of manufacturing a sweet extract from beet, consisting in treating the sugar juices extracted from beet root in an evaporator, raising the temperature of evaporation by setting up a counter pressure in the evaporator, maintaining this pressure only a brief period of time sufficient to insure the odorization of the product, and thereafter removing the counter pressure by allowing the syrup to flow out of the evaporator to be immediately cooled.

2. A process of manufacturing a sweet extract from beet, consisting in treating the sugar juices extracted from beet root in a tubular evaporator, raising the temperature of evaporation by setting up a counter pressure in the evaporator, the relation between the heat surface and the cross-section of the tubes being such that said counter pressure is automatically created as the juices are passing through said tube, maintaining this pressure only a brief period of time sufficient to insure the odorization of the product, and thereafter removing the counter pressure by allowing the syrup to flow out of the evaporator to be immediately cooled.

In testimony whereof I affix my signature, in presence of two witnesses.

PAUL KESTNER.